United States Patent
Nihei (10) Patent No.: US 6,762,874 B2
(45) Date of Patent: Jul. 13, 2004

(54) POLARIZATION INVERSION METHOD OF FERROELECTRICS AND FABRICATION METHOD OF OPTICAL WAVELENGTH CONVERSION DEVICE

(75) Inventor: Yasukazu Nihei, Kaisei-machi (JP)

(73) Assignee: Fuji Photo Film Co., Ltd., Kanagawa-Ken (JP)

(*) Notice: Subject to any disclaimer, the term of this patent is extended or adjusted under 35 U.S.C. 154(b) by 294 days.

(21) Appl. No.: 09/987,131

(22) Filed: Nov. 13, 2001

(65) Prior Publication Data

US 2002/0057489 A1 May 16, 2002

(30) Foreign Application Priority Data

Nov. 14, 2000 (JP) .................................... 2000-346247

(51) Int. Cl.⁷ .......................................... G02F 1/355
(52) U.S. Cl. ...................................................... 359/326
(58) Field of Search ................................ 359/326–332

(56) References Cited

U.S. PATENT DOCUMENTS

| | | | |
|---|---|---|---|
| 5,436,758 A | * 7/1995 | Agostinelli et al. | 359/332 |
| 5,526,173 A | * 6/1996 | Yamaguchi et al. | 359/328 |
| 5,594,746 A | 1/1997 | Harada | |
| 5,781,670 A | * 7/1998 | Deacon et al. | 385/10 |
| 6,002,515 A | * 12/1999 | Mizuuchi et al. | 359/326 |
| 6,624,923 B2 | * 9/2003 | Furukawa et al. | 359/326 |
| 2002/0024716 A1 | * 2/2002 | Furukawa et al. | 359/326 |

FOREIGN PATENT DOCUMENTS

| | | |
|---|---|---|
| JP | 2-187735 A | 7/1990 |
| JP | 7-72521 A | 3/1995 |
| JP | 3005225 B2 | 11/1999 |

OTHER PUBLICATIONS

J.A. Armstrong, et al.; "Interactions between Light Waves in a Nonlinear Dielectric"; Division of Engineering and Applied Physics, Harvard University, vol. 127; No. 6; Sep. 15, 1962, Physical Review, pp. 1918–1939.

* cited by examiner

Primary Examiner—John D. Lee
(74) Attorney, Agent, or Firm—Sughrue Mion, PLLC (57) ABSTRACT

A method for forming a polarization inversion portion, in which electrodes with a predetermined pattern are formed on one surface of a ferroelectric crystal that has been subjected to a single polarization, and a local polarization inversion portion corresponding to the pattern of the electrodes is formed in the ferroelectric crystal by applying electric field to both front and back surfaces of the ferroelectric crystal via the electrodes, makes it possible to accurately form a polarization inversion pattern. In this method, portions of the ferroelectric crystal corresponding to the respective electrodes and portions between these portions are subjected to a polarization inversion, and one polarization inversion portion is formed.

8 Claims, 6 Drawing Sheets

POLARIZATION INVERSION METHOD OF FERROELECTRICS AND FABRICATION METHOD OF OPTICAL WAVELENGTH CONVERSION DEVICE

BACKGROUND OF THE INVENTION

1. Field of the Invention

The present invention relates to a method of forming a polarization inversion portion by applying electric field to a ferroelectric crystal, more particularly to a polarization inversion method of ferroelectrics which is capable of forming a uniform polarization inversion pattern by shortening an electric field application time. Furthermore, the present invention relates to a method of fabricating an optical wavelength conversion device, which applies the polarization inversion method of the ferroelectric.

2. Description of the Related Art

A method has been already proposed by Bleombergen et al., which changes a wavelength of a fundamental wave to that of a second harmonic by use of an optical wavelength conversion device providing an area in which a self-polarization (domain) of ferroelectric showing a nonlinear optical effect is periodically inverted (see Physical Review, Vol. 127, No. 6, pp. 1918 (1962)). In this method, a cycle $\Lambda$ of a polarization inversion portion is set to an integer multiple of a coherence length $\Lambda c$ which is given by the following equation (1)

$$\Lambda c = 2\pi / \{\beta(2\omega) - 2\beta(\omega)\} \tag{1}$$

where $\beta$ ($2\omega$) is a propagation constant of a second harmonic and $\beta$ ($\omega$) is a propagation constant of a fundamental wave. Thus, a phase matching of the second harmonic can be achieved. When the wavelength conversion is performed by use of a bulk crystal of a nonlinear optical material, a wavelength that is subjected to the phase matching is limited to a specific wavelength which is inherent to the crystal. However, according to the above described method, the phase matching that is a so-called pseudo phase matching can be effectively achieved by using the cycle $\Lambda$ satisfying the equation (1) for an desired wavelength.

As a method forming the above described periodic polarization inversion structure, one has been known as described in Japanese Unexamined Patent Publication No.7(1995)-72521. In this method, after periodic electrodes having a predetermined pattern are formed on one surface of a ferroelectric crystal showing a nonlinear optical effect, which has been subjected to a single polarization, a ferroelectric crystal is corona-charged by the periodic electrodes and a corona wire disposed on a surface opposite to that one surface, and electric field is applied to the ferroelectric crystal, thus converting a portion opposite to one of the periodic electrodes of the ferroelectric crystal to a local polarization inversion portion.

In addition to the method which applies the corona charging, a method has been known as is described in Japanese Patent No. 3005225, in which an entire surface electrode is formed on the entire surface of ferroelectric opposite to a surface where periodic electrodes having a predetermined pattern are formed, and electric field is directly applied to the ferroelectric by use of the entire surface electrode and the periodic electrodes, thus forming a local polarization inversion portion.

When the polarization of the ferroelectric crystal is inverted by any of the above described conventional methods, one polarization inversion portion is formed in the portion opposite to a corresponding one of the periodic electrodes of the ferroelectric crystal.

Incidentally, in the case where a periodic polarization inversion structure having a particularly long cycle or a large area is formed in forming the periodic polarization inversion portions in the ferroelectric crystal by use of the above described electrodes, a long electric field application time is required. If the electric field application time is long, a problem is recognized, in which an inversion width is large in an earlier polarization inversion portion where a polarization inversion first starts, and the inversion width is small in a latter polarization inversion portion where the polarization inversion is started later, thus creating unevenness of the width of the polarization inversion portion.

When the foregoing problem occurs in the optical wavelength conversion device in which the periodic polarization inversion structure is formed in a ferroelectric crystal showing then on linear optical effect, a cycle or width ratio of the polarization inversion portions is uneven and a decrease in wavelength conversion efficiency is brought about.

SUMMARY OF THE INVENTION

In consideration of the foregoing circumstances, an object of the present invention is to provide a polarization inversion method of ferroelectrics, which is capable of accurately forming polarization inversion portions having a desired pattern in a short electric field application time.

Another object of the present invention is to provide a method of fabricating an optical wavelength conversion device, which is capable of forming a periodic polarization inversion structure having an excellent periodicity in a nonlinear optical crystal that is ferroelectric.

A first polarization inversion method of ferroelectric of the present invention is one in which one electrode having a shape corresponding to the area is not disposed in an area of a ferroelectric crystal where a polarization is desired to be inverted, but one in which a plurality of electrodes smaller than the area are disposed in this area, and electric field is applied to the ferroelectric crystal through the plurality of electrodes, the method comprising the steps of: forming electrodes having a predetermined pattern on one surface of the ferroelectric crystal that has been subjected to a single polarization; and forming a local polarization inversion portion in the ferroelectric crystal by applying electric fields to front and back surfaces of the ferroelectric crystal via the electrodes, wherein one polarization inversion portion having a desired pattern is formed by allowing portions of the ferroelectric crystal respectively corresponding to the plurality of electrodes and portions between these portions to be polarization-inverted.

A second polarization inversion method of ferroelectrics of the present invention is a method in which the first method is applied especially to a case where a periodic polarization inversion structure is formed. In this second method, periodic electrodes are used as the foregoing electrodes, which include a plurality of electrode groups formed periodically, each being composed of a plurality of electrodes; and each polarization inversion portion is formed for a corresponding one of the electrode groups, thus forming a periodic polarization inversion structure in which the polarization inversion portion is periodically and repetitively formed.

In the polarization inversion method of ferroelectric according to the present invention, a corona wire is disposed on one surface of a ferroelectric crystal opposite to one surface thereof, and electric field should be applied by corona charging by use of the corona wire and the electrodes.

The first and second polarization inversion methods of ferroelectric of the present invention are particularly effective when the ferroelectric crystal is a $LiNb_xTa_{1-x}O_3$ (0<x<1) crystal or a crystal doped with one of MgO, ZnO and Sc.

On the other hand, a method of fabricating an optical wavelength conversion device of the present invention is a method to which the foregoing second polarization inversion method of ferroelectrics of the present invention is applied. In this method of fabricating an optical wavelength conversion device of the present invention, a nonlinear optical crystal is used as a ferroelectric crystal that has been subjected to a single polarization, and a periodic polarization inversion structure corresponding to a periodic pattern of the foregoing one group of the electrodes is formed in the nonlinear optical crystal.

Figure 6A:
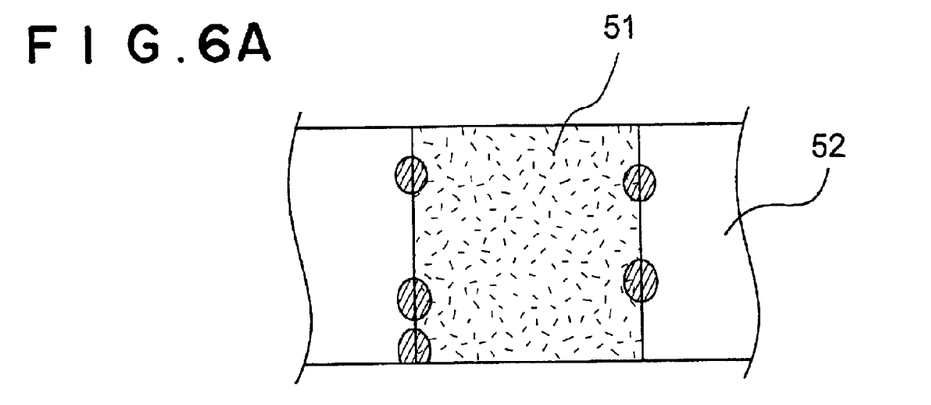
FIGS. 6A, 6B and 6C are schematic views showing a state where a polarization inversion portion is grown.
Figure 6B:
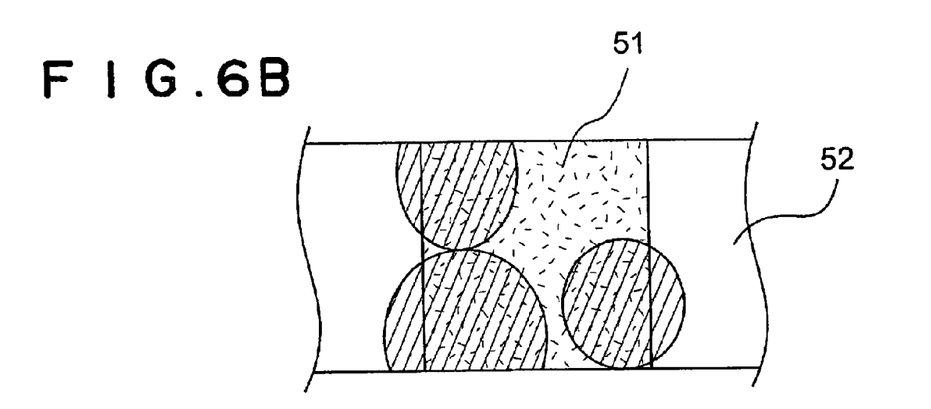
Figure 6C:
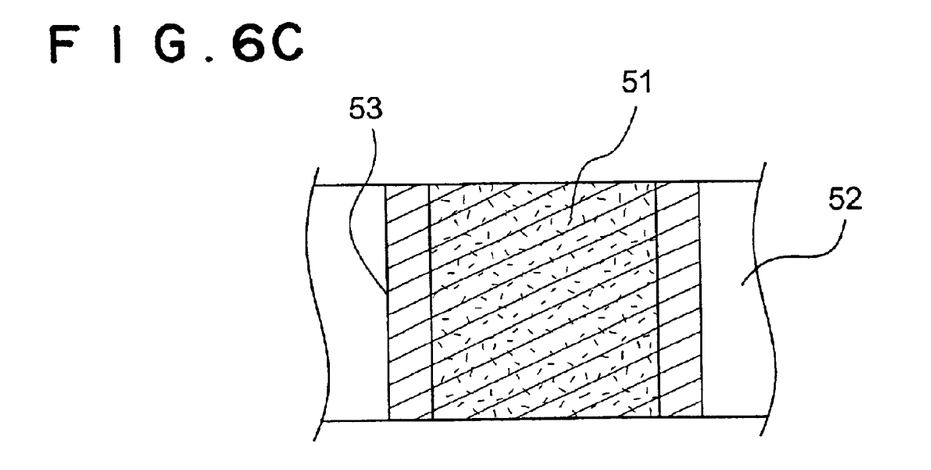

In general, when a polarization of the ferroelectric crystal is inverted, it is proved by experiments that an inversion nucleus first occurs, and then a polarization inversion grows around the inversion nucleus. When electric field is applied to the ferroelectric crystal via the electrode, inversion nuclei that are the portions illustrated by the oblique lines occur in the ends of the electrode 51 of the ferroelectric crystal 52 as shown in FIG. 6A, and the inversion nuclei grow as shown in FIG. 6B. Then, the inversion nuclei connect with each other, and finally the polarization inversion portion 53 having a shape corresponding to the electrode 51 is formed as shown in FIG. 6C.

Figure 7A:
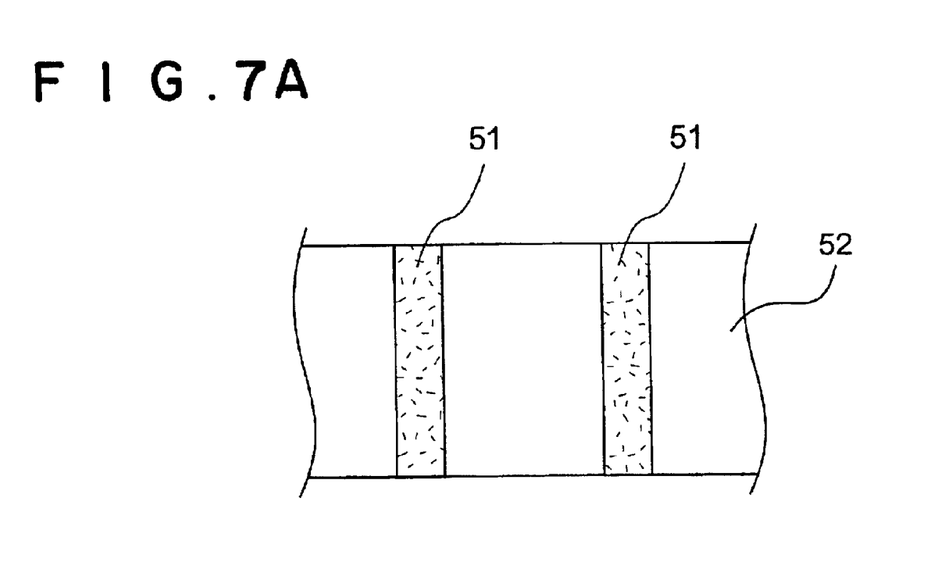
FIGS. 7A and 7B are schematic views showing a relation between a shape of electrodes for electric field application and a polarization inversion pattern in a conventional method.
Figure 7B:
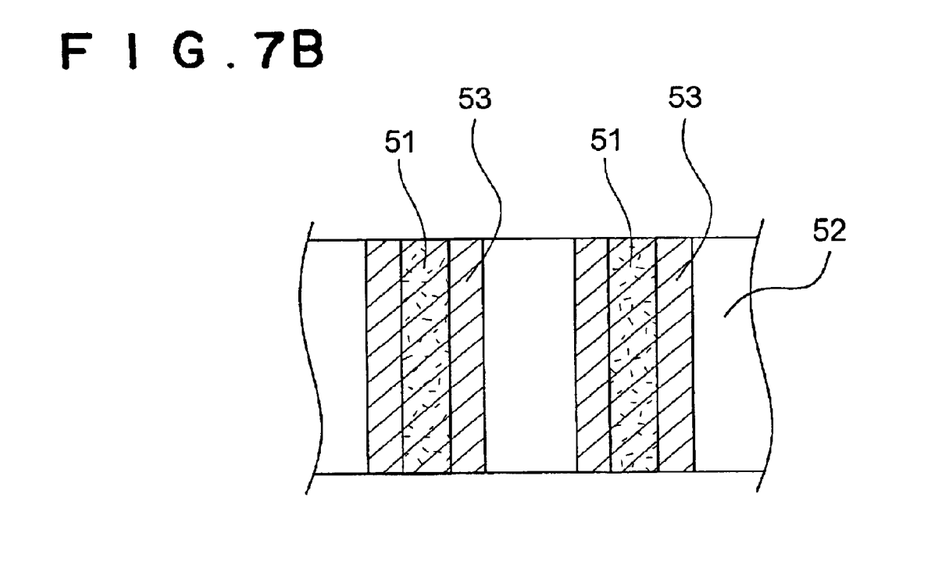

When the periodic polarization inversion structure was formed by the conventional method, the periodic electrodes 51 were previously formed in the ferroelectric crystal 52 as shown in FIG. 7A, and electric field was applied to the ferroelectric crystal 52 via the electrodes 51. With such an electric field application, the polarization inversion portions 53 were allowed to be grown from the electrodes 51 to regions outside the electrodes 51, respectively, as shown in FIG. 7B, and the polarization inversion portions having a desired pattern were formed. Particularly, when a cycle of the polarization inversion portions is long, it has been required to make an electric field application time longer in forming a desired pattern with, for example, an aspect ratio of 1:1.

When the electric field application time, that is, an inversion time was long as in the conventional method, it was proved that charges are apt to concentrate at an earlier polarization inversion portion, that is, at a portion where the inversion nucleus first occurs and this causes unevenness of a width of the polarization inversion. This phenomenon was remarkably recognized in a $LiNb_xTa_{1-x}O_3$ (0<X<1) doped with one of MgO, ZnO and Sc, in which an electrical conductivity of the ferroelectric crystal changes greatly at the boundary of the polarization inversion and charges are prone to concentrate in the earlier polarization inversion portion.

In the first polarization inversion method of ferroelectrics of the present invention, the plurality of electrodes smaller than areas of the ferroelectric crystal where the polarization is desired to be inverted are previously arranged therein, and the electric field is applied to the ferroelectric crystal via the plurality of electrodes. Accordingly, compared to the conventional method in which one electrode having the shape corresponding to the area where the polarization is desired to be inverted is formed therein, more electrode terminals exist in one area where the polarization is desired to be inverted.

Figure 8A:
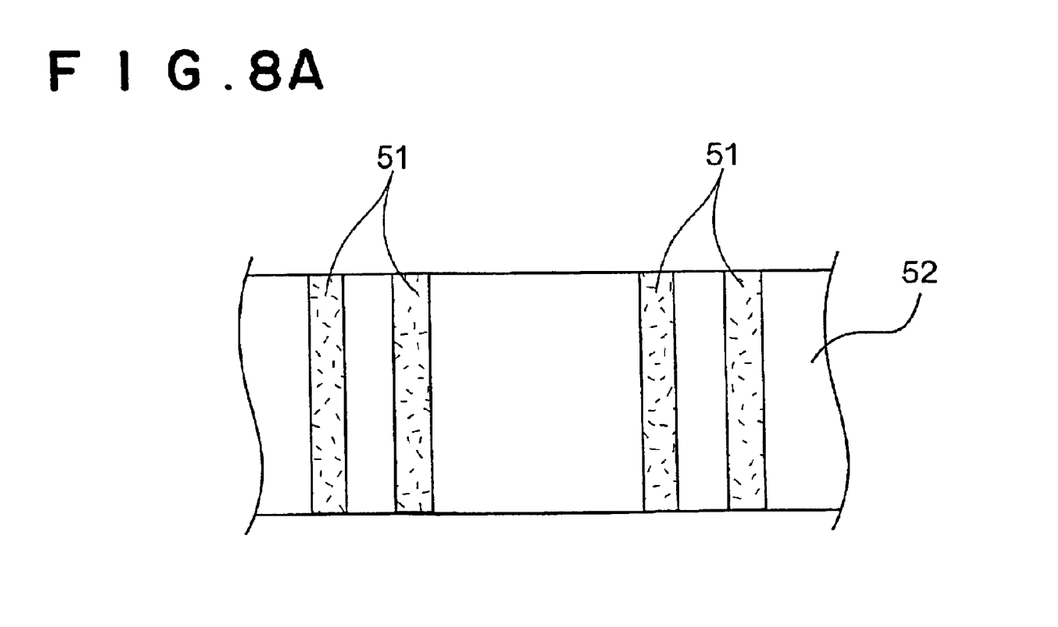
FIGS. 8A and 8B are schematic views showing a relation between a shape of electrodes for electric field application and a polarization inversion pattern in the polarization inversion method of the present invention.
Figure 8B:
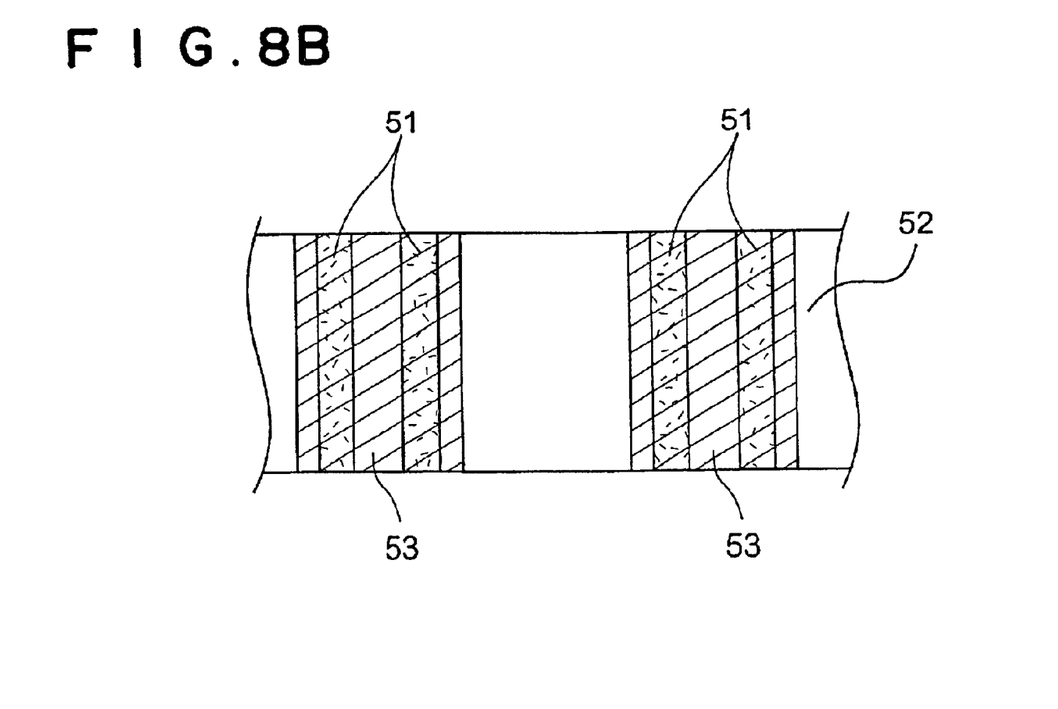

In FIGS. 8A and 8B, shown is a state where the polarization inversion portions 53 with a desired pattern are formed in the ferroelectric crystal 53. In FIGS. 8A and 8B, reference numeral 51 denotes electrodes, and, in FIGS. 8A and 8B, a case in which one polarization inversion portion 53 is formed by the two electrodes 51 is exemplified.

As described above, if more electrode terminals exist where the inversion nuclei occur, the inversion nuclei occur with a high density, so that the polarization inversion portions can be formed in desired areas within a short electric field application time. Accordingly, a drawback caused by a low density of the occurrence of the inversion nuclei and unevenness of the inversion nuclei, that is, a drawback in which the polarization inversion area is broad in the earlier polarization inversion portion and the polarization inversion area is narrow in the latter polarization inversion portion where the polarization inversion starts later is avoided, and the polarization inversion portion having a desired pattern can be formed accurately.

In the first polarization inversion method of ferroelectric of the present invention, periodic electrodes in which the electrode groups composed of the plurality of electrodes are arranged periodically are used as the electrode for use in the electric field application, and one polarization inversion portion is formed for a corresponding one of the electrode groups, thus forming the periodic polarization inversion structure in which the polarization inversion portion is periodically arranged. Accordingly, the second polarization inversion method of ferroelectric of the present invention can avoid a drawback in which the width of the polarization inversion is broad in the earlier polarization inversion portion and the width of the polarization inversion is narrow in the latter polarization inversion portion, and a periodic polarization inversion structure having a uniform cycle and width ratio can be formed.

On the other hand, the method of fabricating an optical wavelength conversion device of the present invention is a method to which the foregoing second polarization inversion method of ferroelectrics is applied. Since the periodic polarization inversion structure corresponding to the periodic pattern of the electrode group is formed in the ferroelectric crystal that is a nonlinear optical crystal, the method of fabricating an optical wavelength conversion device of the present invention can fabricate an optical wavelength conversion device showing high wavelength conversion efficiency, which comprises the periodic polarization inversion structure having a uniform periodicity.

The method of fabricating an optical wavelength conversion device of the present invention is effective when this method is applied to a fabrication of an optical wavelength conversion device which performs a wavelength conversion for infrared-zone light. Specifically, since such a kind of optical wavelength conversion device shows a comparatively long cycle of a polarization inversion portion, that is, a comparatively broad width of the polarization inversion portion, a necessary electric field application time is long, so that a width of the polarization inversion is apt to be uneven. However, occurrence of such a drawback can be reliably prevented with an application of the present invention.

If the cycle of the polarization inversion portions is comparatively long as described above, distance between the electrodes is comparatively broad, and it is easy to form a divided electrode group. On the contrary, when the polarization inversion portions of a short cycle are formed, the width of each electrode in one divided electrode group need be made very small, and working of the electrode is very difficult.

As the number of the electrodes constituting one electrode group is larger, more electrode terminals exist where the inversion nuclei occur, and the foregoing effects of the present invention become conspicuous. However, the width of each electrode becomes narrower as the number of the electrodes is made larger, resulting in difficulty of the working of the electrode. Accordingly, the number of the electrodes constituting one electrode group should be set properly in consideration for both of the effects and the workability.

DESCRIPTION OF THE PREFERRED EMBODIMENTS

Figure 1A:
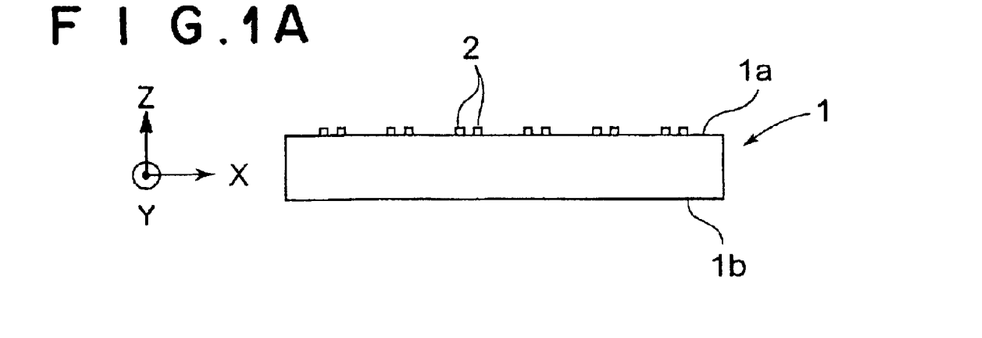
FIGS. 1A, 1B and 1C are schematic views showing steps of a polarization inversion method of ferroelectric according to a first embodiment of the present invention.
Figure 1B:
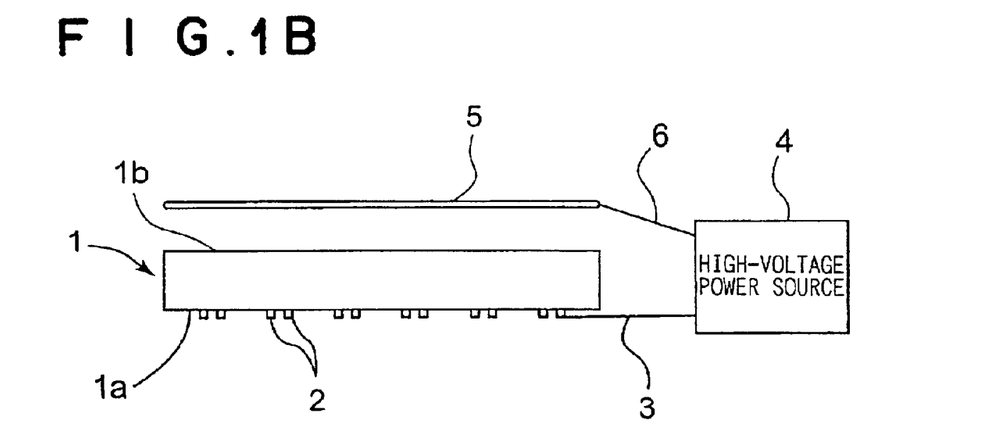
Figure 1C:
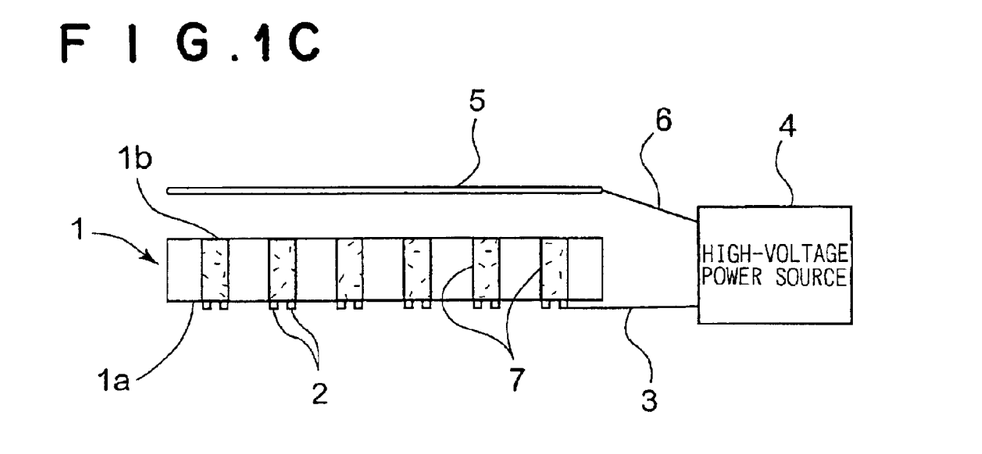

Embodiments of the present invention will be described with reference to the accompanying drawings below. FIGS. 1A, 1B and 1C schematically show steps of the polarization inversion method of ferroelectrics according to a first embodiment of the present invention. In this embodiment, a nonlinear optical crystal is used as a ferroelectric crystal, and periodic electrodes having a periodic pattern is used as electrodes for use in applying electric field. A periodic polarization inversion structure corresponding to the periodic pattern of the electrodes is formed in the nonlinear optical crystal, and thus an optical wavelength conversion device is fabricated.

In FIGS. 1A, 1B and 1C, reference numeral 1 denotes a substrate made of $LiNbO_3$ (MgO-LN) doped with MgO by 5 mol %, which is ferroelectric showing a nonlinear optical effect. This MgO-LN substrate 1 is formed to a thickness of 0.4 mm, which has been subjected to a single polarization treatment. The MgO-LN substrate 1 is cut in its Z plane and optically polished so that the maximum optical constant $d_{33}$ can be effectively utilized.

Figure 2:
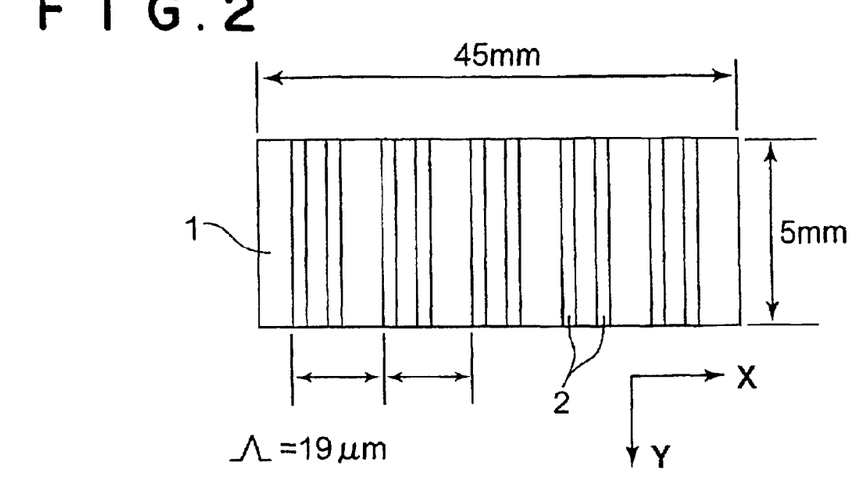
FIG. 2 is a plan view of periodic electrodes used in the first embodiment.

Chromium Cr is evaporated or sputtered onto the +Z plane 1a of the MgO-LN substrate 1, and thus a Cr thin film having a thickness of 50 nm is formed. Subsequently, periodic electrodes 2 made of the Cr thin film are formed by a photolithography technique. These periodic electrodes 2 have approximately a plane shape as shown in FIG. 2, and are formed repetitively in the X-axis direction of the substrate 1. Note that all of these periodic electrodes 2 are stretched from a common base portion (not shown), and electrically communicated with each other.

As shown in FIG. 2, the length (dimension in the X-axis direction) of the MgO-LN substrate 1 is 45 mm, and the width (dimension in the Y-axis direction) thereof is 5 mm. Each of the periodic electrodes 2 has a width of 1 to 2 $\mu$m, and two of the respective periodic electrodes 2 which are arranged at intervals of 1 to 3 $\mu$m constitute one group. Each group is formed repetitively at a constant cycle Λ of 19 $\mu$m. Note that an interval between one periodic electrode 2 constituting one electrode group and one periodic electrode 2 adjacent to this electrode group is made to be larger than an interval of the two periodic electrodes 2 in these groups, which ranges from 1 to 3 $\mu$m.

Next, as shown in FIG. 1B, the periodic electrode 2 is connected to a high-voltage power source 4 through a connection line 3, and a corona wire 5 disposed at a position facing a −Z plane 1b of the MgO LN substrate 1 is connected to the high-voltage power source 4 through a connection line 6. Thus, an electric field is applied to the MgO-LN substrate 1 by utilizing corona charging. Note that in this embodiment, the temperature in electric field application is 100° C. The applied voltage is −3 kV, the applied current is −600 $\mu$A, and the electric field application time is 7 s(seconds).

Polarization inversion portions 7 which penetrate respectively from the +Z plane 1a of the MgO-LN substrate 1a to the −Z plane 1b thereof are formed so as to correspond to the portions where the two periodic electrodes 2 respectively constitute one group and the portions between these respective two periodic electrodes 2. These polarization inversion portions 7 constitute periodic polarization inversion structures repetitively at a cycle equal to the cycle Λ of the electrode group.

When a polarization inversion portion similar to that in this embodiment was formed according to the conventional method by use of periodic electrodes as shown in FIGS. 7A and 7B, an electric field application time of 12 s was required. According to the above described method of this embodiment, it is possible to form the polarization inversion portion 7 within a shorter electric field application time. If the polarization inversion portion 7 within the shorter electric field application time can be formed as described above, the widths of the polarization inversion portions 7 can be made to be equal to each other for the reasons described in detail above. Accordingly, formation of a periodic polarization inversion structure with excellent periodicity is made possible.

Results obtained by actually evaluating the periodicity of the periodic polarization inversion structure will be described below. When the MgO-LN substrate 1 having the periodic polarization inversion structure formed therein was dipped for 30 minutes in mixed solution HF (hydrofluoric acid) $HNO_3$ (nitric acid)=1:2, which was kept at room temperature, an etching step difference corresponding to the polarization inversion was created by a difference between etching rates owing to a difference of polarization directions. Thus, it was possible to confirm the polarization inversion pattern. When the polarization inversion pattern was observed by an optical microscope, it was confirmed that the width of the polarization inversion portion 7 was more uniform all over the length of the MgO-LN substrate 1, which is 45 mm, compared to the case where the polarization inversion portions were formed according to the foregoing conventional methods.

Figure 3:
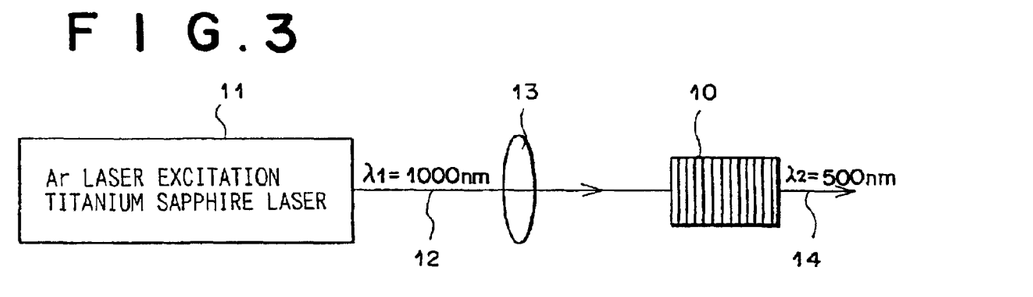
FIG. 3 is a schematic view showing a state where an optical wavelength conversion device fabricated by the method of the first embodiment is used.

The +X and −X planes of the MgO-LN substrate 1 in which the periodic polarization inversion structure was formed according to the above described first embodiment were polished, and then coating was carried out on these +X and −X planes thereof. Thus, an optical wavelength conversion device having a light pass length of 3 mm was fabricated. As shown in FIG. 3, laser lights 12 having a wavelength $\lambda_1$ of 1000 nm, which were emitted from an Ar laser excitation titanium sapphire laser 11 were collected by a collective lens 13, and the collected laser light was allowed to be incident onto the optical wavelength conversion device 10.

The laser light 12 as a fundamental wave was converted to a second harmonic 14 having a wavelength $\lambda_2$ of 500 nm by the optical wavelength conversion device 10. In this case, a tertiary pseudo phase matching was made. Wave length conversion efficiency at the time when the tertiary pseudo phase matching was made was measured, and a nonlinear optical constant d of the foregoing optical wavelength conversion device 10 was determined based on the measurement value of the wavelength conversion efficiency. The nonlinear optical constant d was 4.0 pm/V.

From the MgO-LN substrate that has been subjected to the polarization inversion by use of the periodic electrodes as shown in FIGS. 7A and 7B according to the conventional method, an optical wavelength conversion device as a comparative example was fabricated in a similar manner to the above. This optical wavelength conversion device fabricated according to the conventional method was used as shown in FIG. 3, and a second harmonic was generated therefrom. Wavelength conversion efficiency when the second harmonic was generated was measured, and a nonlinear optical constant d of the optical wavelength conversion device as the comparative example was determined based on the measurement value of the wavelength conversion efficiency. The nonlinear optical constant d was 2.7 pm/V.

As described above, the optical wavelength conversion device 10 fabricated by the method of the present invention showed a significantly improved nonlinear optical constant compared to the optical wavelength conversion device fabricated by the conventional method. From this point, according to the present invention, it was proved that it is possible to form the periodic polarization inversion structure having an excellent periodicity by growing the polarization inversion portions uniformly.

Next, a second embodiment of the present invention will be described with reference to FIG. 4. The equivalent constituent components to those in FIG. 2 are denoted by the same reference numerals, and descriptions for these constituent components are omitted if not necessary.

Figure 4:
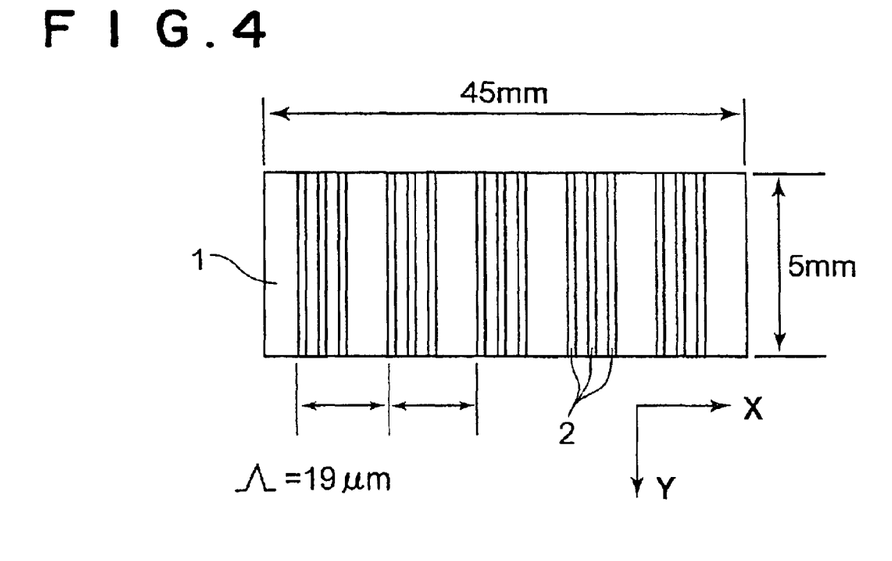
FIG. 4 is a plan view of periodic electrodes used for a polarization inversion method of ferroelectric according to a second embodiment of the present invention.

FIG. 4 shows the MgO-LN substrate 1 in which the periodic polarization inversion structure by the second embodiment of the present invention is formed, and the shape of the periodic electrodes 2 formed for use in applying electric field thereto. In this embodiment shown in FIG. 4, one group of the electrodes composing one polarization inversion portion is constituted by the three periodic electrodes 2, and other portions of the optical wavelength conversion device of the second embodiment, the shape of the MgO-LN substrate 1 included, are basically identical to those of the first embodiment.

Each of the periodic electrodes 2 has a width ranging from 1 to 2 $\mu$m, and the three periodic electrodes which are arranged at intervals ranging from 1 to 3 $\mu$m constitute one group. The cycle Λ of the electrode group is 19 $\mu$m, which is equal to that of the first embodiment. Distance between one periodic electrode 2 constituting one electrode group and one periodic electrode 2 constituting an adjacent electrode group is larger than the intervals, each ranging from 1 to 3 $\mu$m, between three periodic electrodes 2 constituting one electrode group.

An electric field application by corona charging was performed for the constitution similar to that shown in FIGS. 1A and 1B by use of the periodic electrodes 2 arranged as described above, and thus the periodic polarization inversion portion was formed in the MgO-LN substrate 1. In this case, if the temperature, the application voltage and the application current at the time of the electric field application are set to be equal to those in the first embodiment, the electric field application time is 5 s, and further shortened compared to the 7 s of the first embodiment.

If the electric field application time is further shortened, the periodicity of the periodic polarization inversion structure becomes more excellent. The optical wavelength conversion device 10 similar to that shown in FIG. 3 was fabricated from the MgO-LN substrate 1 in which the periodic polarization inversion structure was formed by the second embodiment. When the laser light 12 having a wavelength $\lambda_1$ of 1000 nm, which was emitted from the Ar laser excitation titanium sapphire laser 11 was converted to the second harmonic 14 having a wavelength $\lambda_2$ of 500 nm by the optical wavelength conversion device 10, the nonlinear optical constant d was 4.3 pm/V. This value of the nonlinear optical constant d is larger than that of the nonlinear optical constant d (=4.0 pm/V) of the optical wavelength conversion device 10 according to the first embodiment. From this point, it is proved that the optical wavelength conversion device of the second embodiment possesses a more excellent periodicity of the periodic polarization inversion structure compared to that of the first embodiment.

Figure 5A:
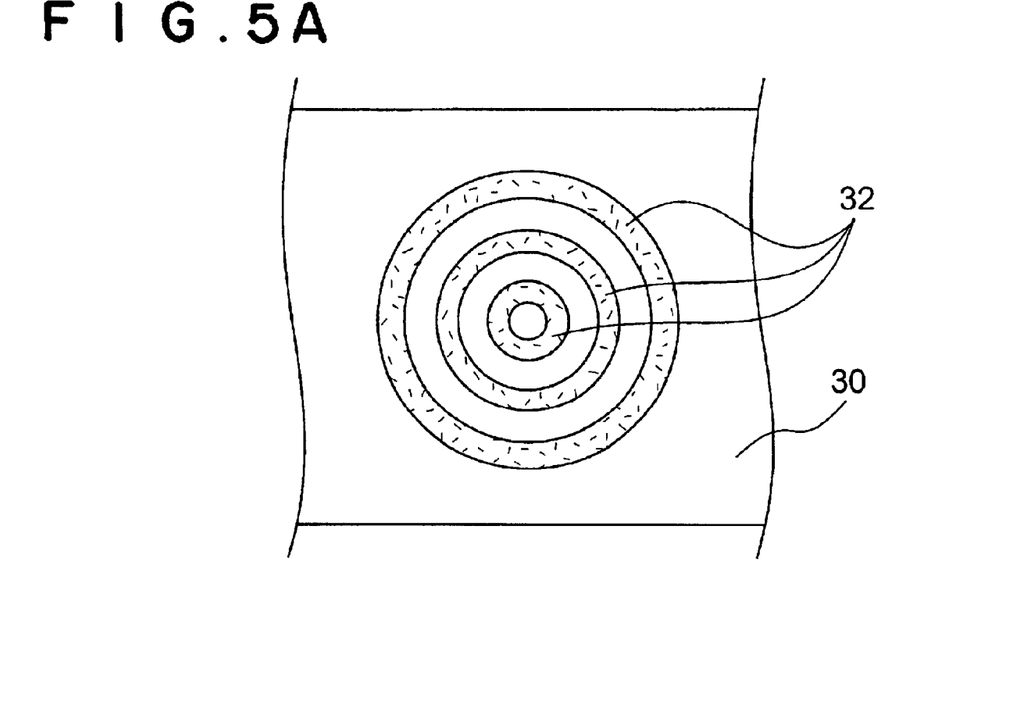
FIGS. 5A and 5B are plan views showing another example of the periodic electrodes used for the polarization inversion method of ferroelectric of the present invention.
Figure 5B:
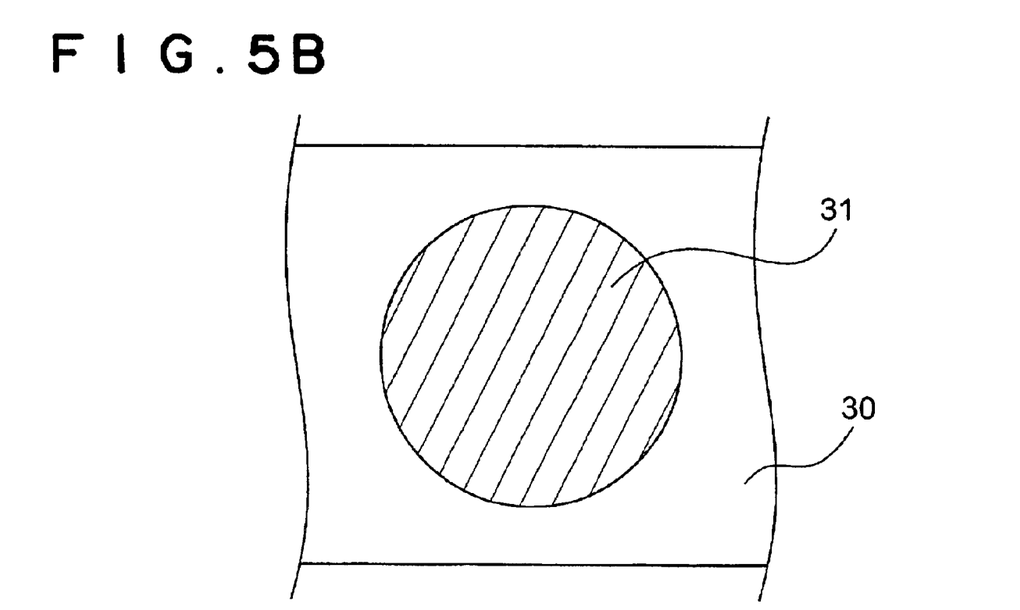

As described above, the embodiments of the polarization inversion method of ferroelectrics in which the periodic line polarization inversion pattern is formed were described. However, the polarization inversion method of ferroelectric of the present invention can be applied to a case where a polarization inversion pattern other than that described above is formed, and the same effects can be exhibited. For example, when a dot-shaped polarization inversion pattern 31 is formed in a ferroelectric crystal 30 as shown in FIG. 5B, electrodes 32 having a concentric circle-shaped pattern shown in FIG. 5A are formed on the ferroelectric crystal 30, and electric field may be applied to the ferroelectric crystal 30 via these electrodes 32.

In short, according to the present invention, a plurality of electrodes of a divided form in a desired polarization inversion pattern are formed on a surface of a ferroelectric crystal, and an electric field is applied to the ferroelectric crystal via these electrodes. Thus, many electrode terminals exist in the desired polarization inversion pattern, and hence a density of inversion nuclei is made to be high. Accordingly, it is possible to accurately form a desired polarization inversion pattern.

What is claimed is:

1. A polarization inversion method for ferroelectrics, comprising the steps of:

forming a plurality of electrodes on a first surface of a ferroelectric crystal that has been subjected to a single polarization, the electrodes having a predetermined pattern;

forming a local polarization inversion portion in said ferroelectric crystal by applying an electric field to front and back surfaces of said ferroelectric crystal;

wherein first portions of said ferroelectric crystal, each corresponding to a corresponding one of the electrodes and second portions between the first portions are subjected to a polarization inversion, and one polarization inversion portion having a desired pattern is formed; and wherein one polarization inversion portion is formed for each group of electrodes by use of periodic electrodes in which a plurality of electrode groups composed of the electrodes are periodically formed as said electrodes, thus forming a periodic polarization inversion structure in which the polarization inversion portion is periodically formed.

2. The method according to claim 1, wherein a corona wire is disposed on a second surface of said ferroelectric crystal opposite to said first surface thereof, and said electric field is applied to said ferroelectric crystal by corona charging by use of said corona wire and said electrodes.

3. The method according to claim 1, wherein a corona wire is disposed on a second surface of said ferroelectric crystal opposite to said first surface thereof, and said electric field is applied to said ferroelectric crystal by corona charging by use of said corona wire and said electrodes.

4. The method according to claim 1, wherein said ferroelectric crystal is a $LiNb_xTa_{1-x}O_3$ ($0<X<1$) crystal or a crystal doped with one of MgO, ZnO and Sc.

5. The method according to claim 1, wherein said ferroelectric crystal is a $LiNb_xTa_{1-x}O_3$ ($0<X<1$) crystal or a crystal doped with one of MgO, ZnO and Sc.

6. The method according to claim 2, wherein said ferroelectric crystal is a $LiNb_xTa_{1-x}O_3$ ($0<X<1$) crystal or a crystal doped with one of MgO, ZnO and Sc.

7. The method according to claim 3, wherein said ferroelectric 15 crystal is a $LiNb_xTa_{1-x}O_3$ ($0<X<1$) crystal or a crystal doped with one of MgO, ZnO and Sc.

8. A method of fabricating an optical wavelength conversion device using the polarization inversion method of ferroelectrics according to one of claims 1 to 7, the method comprising the steps of:

using a nonlinear optical crystal as the ferroelectric crystal that has been subjected to the single polarization; and forming in said nonlinear optical crystal a periodic polarization inversion structure corresponding to a periodic pattern of electrode groups.

* * * * *